United States Patent
Grasnick (10) Patent No.: US 9,941,673 B2
(45) Date of Patent: Apr. 10, 2018

(54) ARRANGEMENT COMPRISING A SWITCH FOR SWITCHING POWERS

(71) Applicant: Siemens Aktiengesellschaft, Munich (DE)

(72) Inventor: Steffen Grasnick, Fuerstenwalde (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/360,211

(22) Filed: Nov. 23, 2016

(65) Prior Publication Data

US 2017/0155232 A1 Jun. 1, 2017

(30) Foreign Application Priority Data

Dec. 1, 2015 (DE) .................. 10 2015 223 882

(51) Int. Cl.
*H01B 1/04* (2006.01)
*H01B 1/20* (2006.01)
(Continued)

(52) U.S. Cl.
CPC ............... *H02B 1/04* (2013.01); *H01H 1/06* (2013.01); *H01H 9/20* (2013.01); *H02B 1/36* (2013.01); *H02B 11/173* (2013.01)

(58) Field of Classification Search
CPC ....... H01L 2924/00; H01L 2224/73265; H01L 2224/48227; H01L 2224/32145;
(Continued)

(56) References Cited

U.S. PATENT DOCUMENTS 4,680,562 A * 7/1987 Bratkowski ........ H01H 71/2418
335/16
4,760,364 A * 7/1988 Ostby .................... H01H 50/22
200/293

(Continued)

OTHER PUBLICATIONS

Extended European Search Report dated Mar. 16, 2017.

*Primary Examiner* — Adam B Dravininkas
(74) *Attorney, Agent, or Firm* — Harness, Dickey & Pierce, P.L.C.

(57) ABSTRACT

An arrangement includes a switch including a plurality of connectable modules. A first module is a connection module, electrical connections running into an interior, starting from the connection module for connection purposes. A second module is a manual plug module, connectable via its second contacts to the connection module, electrical connections passing external to the switch starting from the manual plug module for connection purposes. A third module is a communication module including a communication electronics system and including second contacts and first contacts, the communication module being connectable via its second contacts to the connection module and the manual plug module being connectable via its second contacts to the communication module. Second contacts of the communication module are electrically connectable to first contacts of the communication module or to the communication electronics system. The communication module is a communication adapter and the communication electronics system is connectable thereto.

20 Claims, 6 Drawing Sheets (51) Int. Cl.
*H02B 1/04* (2006.01)
*H02B 11/173* (2006.01)
*H02B 1/36* (2006.01)
*H01H 1/06* (2006.01)
*H01H 9/20* (2006.01)

(58) Field of Classification Search
CPC ... H02B 1/26; H02B 3/00; H02B 1/20; H02B 1/30; H02B 1/04; H02B 11/173; H02B 1/36; H01H 9/20; H01H 1/06
See application file for complete search history.

(56) References Cited

U.S. PATENT DOCUMENTS

| | | | | |
|---|---|---|---|---|
| 5,162,766 A | * | 11/1992 | Morris | H01H 71/123 |
| | | | | 335/202 |
| 5,652,420 A | * | 7/1997 | Innes | H01H 71/02 |
| | | | | 200/307 |
| 5,870,278 A | * | 2/1999 | Girard | H02B 1/04 |
| | | | | 200/307 |
| 7,821,364 B2 | * | 10/2010 | Birzer | H01H 50/14 |
| | | | | 335/132 |
| 2012/0050855 A1 | * | 3/2012 | Cochius | G06F 1/1603 |
| | | | | 359/462 |
| 2014/0126158 A1 | * | 5/2014 | Baran | H01H 71/08 |
| | | | | 361/729 |

* cited by examiner

ARRANGEMENT COMPRISING A SWITCH FOR SWITCHING POWERS

PRIORITY STATEMENT

The present application hereby claims priority under 35 U.S.C. § 119 to German patent application number DE 102015223882.2 filed Dec. 1, 2015, the entire contents of which are hereby incorporated herein by reference.

FIELD

At least one embodiment of the invention generally relates to an arrangement comprising a switch for switching powers.

BACKGROUND

In particular, low-voltage power switches are known and have a dedicated housing on which a connection module is arranged. Electrical lines which lead into the switch interior which contain various electrical components are connected to the connection module. The connection module is frequently designed as a contact strip, the contacts of the contact strip being accessible from the outside. Therefore, electrical connections into the switch interior can be established for connection purposes via the contacts. A manual plug module which has corresponding complementary contacts which make contact with the contacts of the connection module can be plugged onto the connection module. Electrical lines which establish electrical connections to external devices and units are likewise connected to the manual plug module.

There is an increasing requirement in modern power switches to integrate communication capabilities into the power switch. In particular, it is desirable to be able to upgrade the power switch in a simple manner by way of up-to-date communication electronics, without having to purchase a new power switch.

U.S. Pat. No. 5,652,420 A discloses connecting a communication module, which comprises electronics for communication, between the connection module and the manual plug module, which can be plugged onto the connection module, via corresponding plug contacts, wherein the three modules can be plugged one onto the other.

SUMMARY

At least one embodiment of the invention includes an arrangement comprising a switch for switching powers, which switch is connectable to customer connection modules via a manual plug module (a pluggable manual plug) and which can be upgraded in a simple manner in respect of communication electronics.

In least one embodiment of the invention, the communication module is in the form of a communication adapter and the communication electronics system can be plugged onto the communication adapter, allowing the communication electronics system to be changed in a simple manner and/or upgraded in a simple manner.

At least one embodiment of the invention is directed to an arrangement, comprising:

a switch for switching power in a low-voltage range, the switch including a plurality of modules, each of the plurality of modules being connectable to another of the plurality of modules, first contacts of a first module of the plurality of modules being connectable with second contacts of another one of the plurality of modules, wherein the first module is a connection module, electrical connections running into an interior of the switch starting from the connection module for connection purposes, and wherein a second module of the plurality of modules is a manual plug module, connectable via its second contacts to the connection module, electrical connections passing external to the switch starting from the manual plug module for connection purposes, wherein a third module of the plurality of modules is a communication module including a communication electronics system and including second contacts on one contact side and first contacts on an opposite contact side, the communication module being connectable via its second contacts to the connection module and the manual plug module being connectable via its second contacts to the communication module, and second contacts of the communication module being electrically connectable to first contacts of the communication module or to the communication electronics system, wherein the communication module is in the form of a communication adapter and wherein the communication electronics system is connectable to the communication adapter.

At least one embodiment of the invention is directed to a switch for switching power in a low-voltage range, the switch comprising:

a plurality of modules, each of the plurality of modules being connectable to another of the plurality of modules, first contacts of a first module of the plurality of modules being connectable with second contacts of another one of the plurality of modules, wherein the first module is a connection module, electrical connections running into an interior of the switch starting from the connection module for connection purposes, and wherein a second module of the plurality of modules is a manual plug module, connectable via its second contacts to the connection module, electrical connections passing external to the switch starting from the manual plug module for connection purposes, wherein a third module of the plurality of modules is a communication module including a communication electronics system and including second contacts on one contact side and first contacts on an opposite contact side, the communication module being connectable via its second contacts to the connection module and the manual plug module being connectable via its second contacts to the communication module, and second contacts of the communication module being electrically connectable to first contacts of the communication module or to the communication electronics system, wherein the communication module is in the form of a communication adapter and wherein the communication electronics system is connectable to the communication adapter.

BRIEF DESCRIPTION OF THE DRAWINGS

The invention will be described by way of example below with reference to a drawing, in which.

DETAILED DESCRIPTION OF THE EXAMPLE EMBODIMENTS

At least one embodiment of the invention includes an arrangement comprising a switch for switching powers, which switch can be connected to customer connection modules via a manual plug module (a pluggable manual plug) and which can be upgraded in a simple manner in respect of communication electronics.

In least one embodiment of the invention, the communication module is in the form of a communication adapter and the communication electronics system can be plugged onto the communication adapter, allowing the communication electronics system to be changed in a simple manner and/or upgraded in a simple manner.

The ability to vary the arrangement can be improved when the communication adapter respectively has the first contacts and the second contacts on opposite contact sides which are averted from one another, wherein the communication electronics system is arranged on the communication adapter on one of the two sides which run transverse to the contact sides (on the switch front side or on the switch rear side as seen from the front of the switch).

A simple and reliable design is achieved when the modules are in the form of contact strips which have contacts at least on one side.

A stable and electrically safe connection can be achieved when the first contacts of the contact strips are in the form of blade contacts.

In order to allow the switch to be inserted into a withdrawable rack of a switchgear cabinet in a simple manner, it is proposed that the communication adapter is formed from two strip-like supports which are electrically connected to one another, wherein the electrical connections into the switch interior are made by way of the first support which is fixedly arranged on the switch, and wherein the manual plug module can be plugged onto the second support which is fixedly arranged on a withdrawable rack and supports the communication electronics system, wherein the withdrawable rack is arranged in a switchgear cabinet.

A further simplification is produced when the switch can be inserted into the withdrawable rack and the two strip-like supports make contact with one another during the insertion process.

In the following, embodiments of the invention are described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Figure 1:
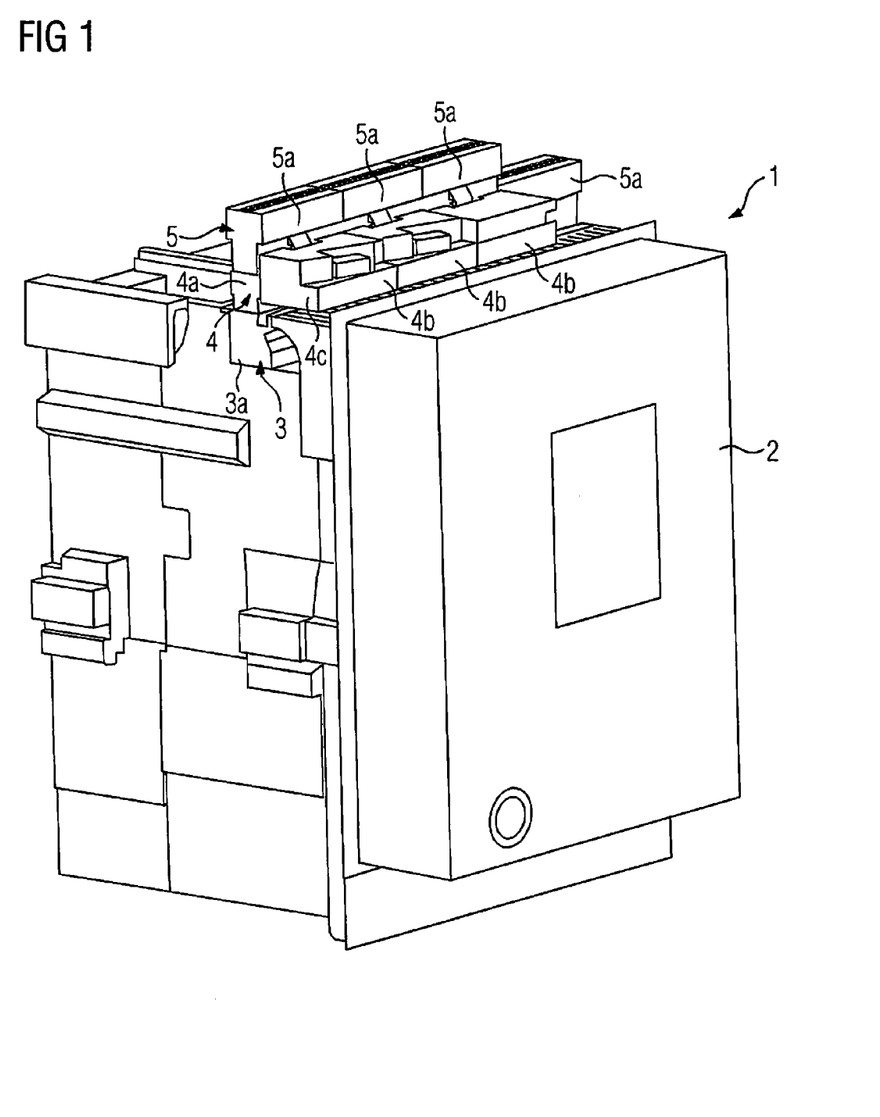
FIG. 1 shows an arrangement comprising a switch for switching powers in the low-voltage range, including a communication electronics system.

FIG. 1 shows an arrangement 1 which include a switch 2 and of modules 3, 4, 5 which are arranged on the switch 2, wherein, in FIG. 1 in particular, four modules 3 are arranged in a row next to one another, and three modules 4 are arranged above the four modules 3 on the left-hand side in FIG. 1, and one module 5 is arranged above each of the modules 4. Only one module 5 is arranged on the module 3 on the far right-hand side. All three modules 3, 4, 5 are in the form of contact strips here.

Each module 4 or 5, which is arranged above a module 3 or 4, is plugged onto the module in each case. All of the modules 3, 4, 5 which are in the form of contact strips here have first and/or second electrical contacts, wherein the first contacts K1 are in the form of blade contacts KM and the second contacts K2 are in the form of contacts which complement the blade contacts KM (complementary contacts). When module 4, 5 is connected by being plugged, first contacts of the receiving module 3, 4 each make contact with second contacts K2 of the module 4, 5 to be (directly) plugged onto first the module.

The modules 3 are, in particular, in the form of connection modules 3a, the modules 4 are in the form of communication modules 4c, and the modules 5 are in the form of manual plug modules 5a.

Electrical lines lead from the connection modules 3a, which are arranged on the switch 2, into the switch interior, where they are connected (not shown) to electrical components of the switch 2.

Each communication module 4c is formed from a communication adapter 4a and a communication electronics system 4b, wherein the communication electronics system 4b is arranged on the communication adapter 4a and is electrically connected to the communication adapter.

Electrical lines are connected to the manual plug module 5a, the electrical lines establishing electrical connections to external devices and units (none of which are shown).

The manual plug module 5a can be plugged both onto the communication adapter 4a and onto the connection module 3a. In FIG. 1, the manual plug modules 5a are each plugged onto a communication adapter 4a of a communication module 4c on the left-hand side, and a manual plug module 5a is plugged directly onto a connection module 3a on the right-hand side. It goes without saying that the latter is possible only when a communication module 4c is not plugged onto the connection module 3a. The communication module 4c can therefore also be connected in an intermediate manner (plugged on in an intermediate manner) subsequently, for example when new requirements in respect of communication are made, without the switch 2 having to be replaced for this purpose.

Figure 2:
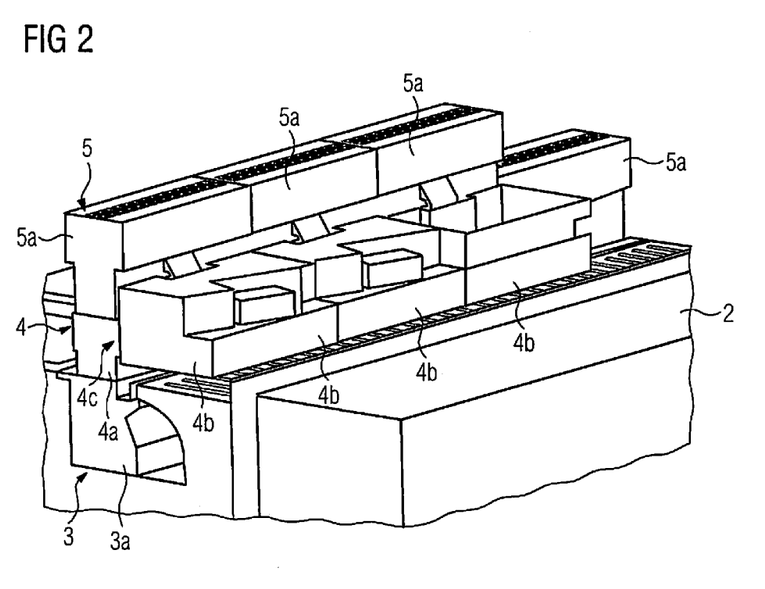
FIG. 2 shows the arrangement according to FIG. 1 in the form of a detail with the modules in an enlarged illustration.

FIG. 2 shows a detail of an arrangement according to FIG. 1 with the modules 3, 4, 5 in an enlarged illustration.

Figure 3:
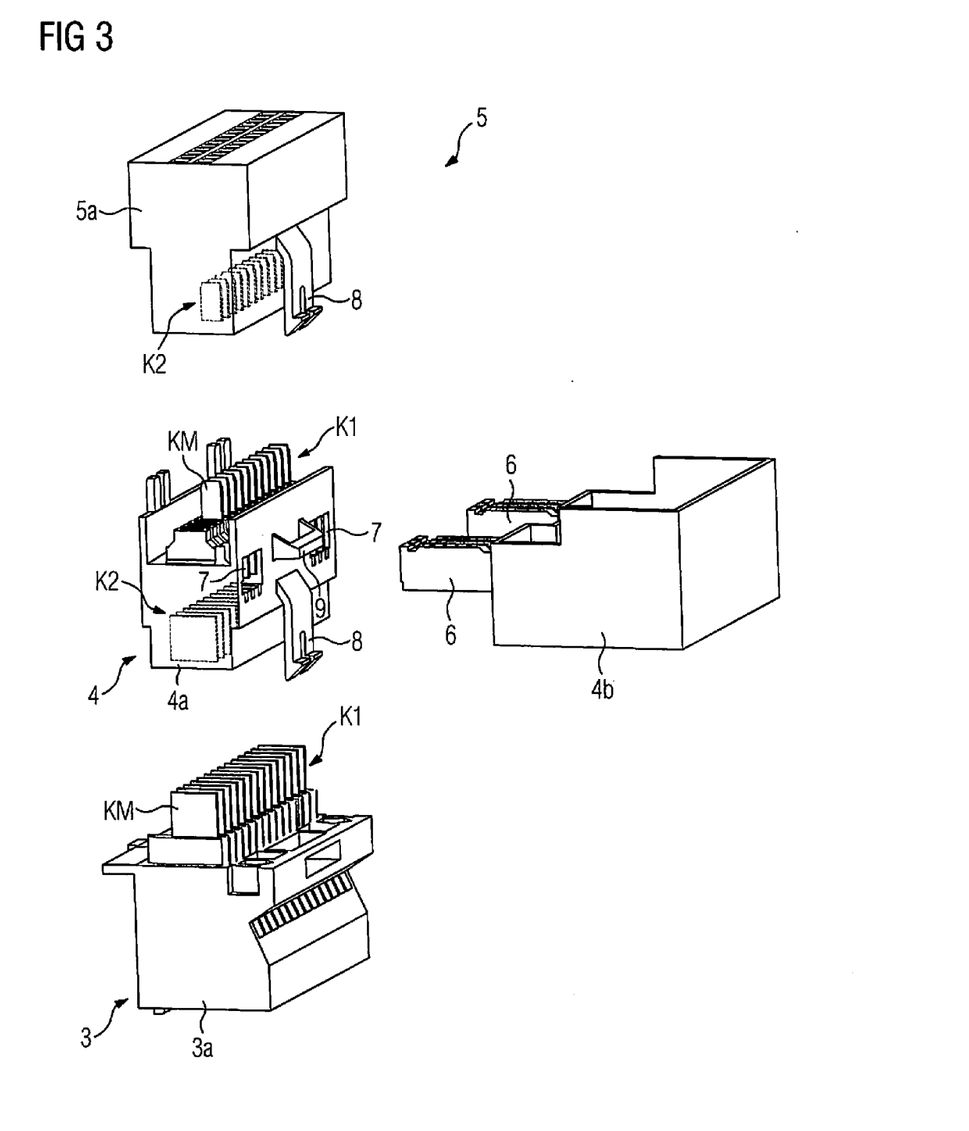
FIG. 3 shows an exploded illustration of the modules according to FIG. 2.

In FIG. 3, the three modules 3, 4, 5 and the communication electronics system 4b from FIG. 2 are illustrated in an exploded manner for the purpose of better understanding. FIG. 3 shows that the communication electronics system is also plugged onto the adapter 4a in each case.

Figure 4:
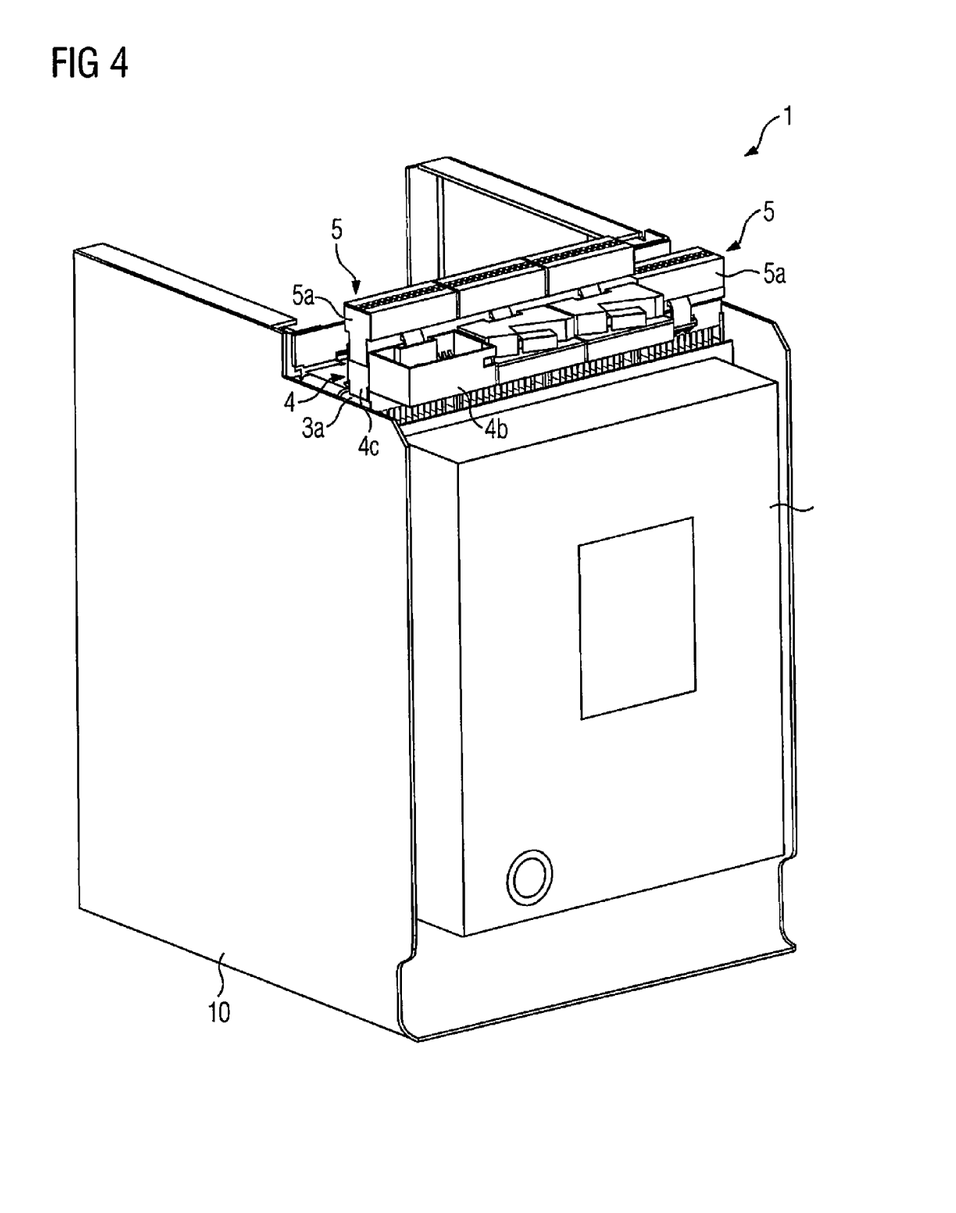
FIG. 4 shows the switch according to FIG. 1 inserted into a withdrawable rack.

FIG. 4 shows the switch 2 inserted into a withdrawable rack 10 of a switchgear cabinet (not shown), that is to say in its final position.

Figure 5:
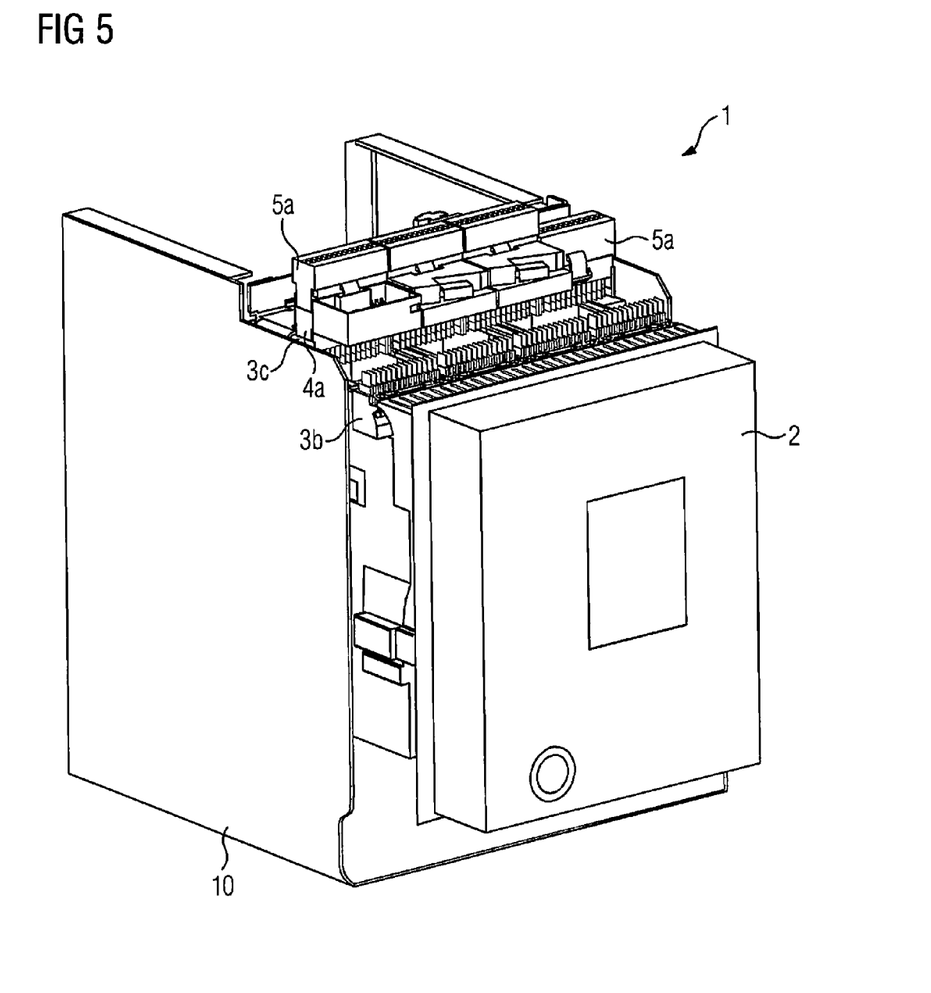
FIG. 5 shows the switch according to FIG. 4 in a state withdrawn from the withdrawable rack to a certain extent.

FIG. 5 shows the switch 2 in a position in which it is not yet fully inserted into the withdrawable rack 10 (or withdrawn from the withdrawable rack 10 to a certain extent). The figure shows that the connection module 3a is of two-part design; it consists of two strip-like supports 3b, 3c which are electrically connected to one another and which do not yet make contact with one another in FIG. 5 and make contact with one another in FIG. 4.

Figure 6:
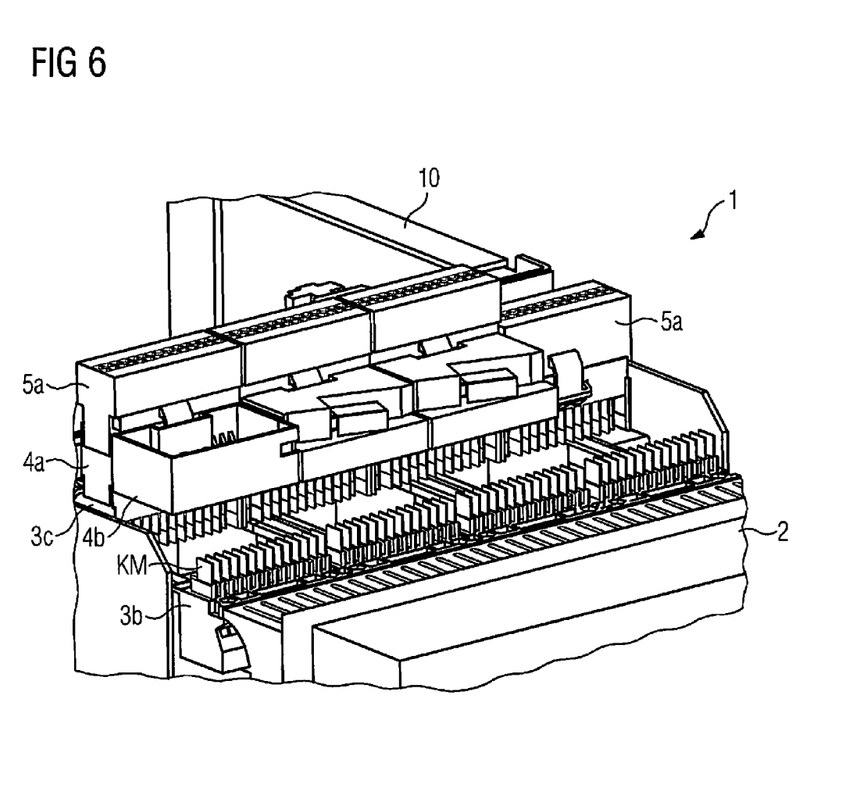
FIG. 6 shows the arrangement according to FIG. 5 in the form of a detail with the modules in an enlarged illustration.

FIG. 6 shows a detail of the arrangement 1 according to FIG. 5 with the two supports 3b, 3c once again illustrated on an enlarged scale for the purpose of better understanding.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An arrangement, comprising:
a switch for switching power in a low-voltage range, the switch including a plurality of modules, each of the plurality of modules being connectable to another of the plurality of modules, first contacts of a first module of the plurality of modules being connectable with second contacts of another one of the plurality of modules,
wherein the first module is a connection module, electrical connections running into an interior of the switch starting from the connection module for connection purposes, and
wherein a second module of the plurality of modules is a manual plug module, connectable via its second contacts to the connection module, electrical connections passing external to the switch starting from the manual plug module for connection purposes,
wherein a third module of the plurality of modules is a communication module including second contacts on one contact side and first contacts on an opposite contact side, the communication module being connectable via its second contacts to the connection module and the manual plug module being connectable via its second contacts to the communication module, and second contacts of the communication module being electrically connectable to first contacts of the communication module or to a communication electronics system,
wherein the communication module is in the form of a communication adapter and wherein the communication electronics system is connectable to the communication adapter.

2. The arrangement of claim 1, wherein the communication electronics system is connectable to the communication adapter on one of two sides which run transverse to the contact sides.

3. The arrangement of claim 2, wherein the plurality of modules are in the form of contact strips including contacts at least on one side.

4. The arrangement of claim 3, wherein the first contacts of the contact strips are in the form of blade contacts.

5. The arrangement of claim 2, wherein the connection module is formed from two strip-like supports electrically connectable to one another, wherein the electrical connections into the switch interior are made via the first support, fixedly arranged on the switch, and wherein the manual plug module is connectable onto the second support, fixedly arranged on a withdrawable rack and supporting the communication electronics system.

6. The arrangement of claim 5, wherein the switch is insertable inserted into the withdrawable rack and wherein the two supports make contact with one another during the insertion process.

7. The arrangement of claim 2, wherein each of the plurality of modules are connectable by being pluggable to another of the plurality of modules via a plug connection.

8. The arrangement of claim 1, wherein the plurality of modules are in the form of contact strips including contacts at least on one side.

9. The arrangement of claim 8, wherein the first contacts of the contact strips are in the form of blade contacts.

10. The arrangement of claim 9, wherein the connection module is formed from two strip-like supports electrically connectable to one another, wherein the electrical connections into the switch interior are made via the first support, fixedly arranged on the switch, and wherein the manual plug module is connectable onto the second support, fixedly arranged on a withdrawable rack and supporting the communication electronics system.

11. The arrangement of claim 10, wherein the switch is insertable inserted into the withdrawable rack and wherein the two supports make contact with one another during the insertion process.

12. The arrangement of claim 8, wherein the connection module is formed from two strip-like supports electrically connectable to one another, wherein the electrical connections into the switch interior are made via the first support, fixedly arranged on the switch, and wherein the manual plug module is connectable onto the second support, fixedly arranged on a withdrawable rack and supporting the communication electronics system.

13. The arrangement of claim 12, wherein the switch is insertable inserted into the withdrawable rack and wherein the two supports make contact with one another during the insertion process.

14. The arrangement of claim 1, wherein the connection module is formed from two strip-like supports electrically connectable to one another, wherein the electrical connections into the switch interior are made via the first support, fixedly arranged on the switch, and wherein the manual plug module is connectable onto the second support, fixedly arranged on a withdrawable rack and supporting the communication electronics system.

15. The arrangement of claim 14, wherein the switch is insertable inserted into the withdrawable rack and wherein the two supports make contact with one another during the insertion process.

16. The arrangement of claim 1, wherein each of the plurality of modules are connectable by being pluggable to another of the plurality of modules via a plug connection.

17. A switch for switching power in a low-voltage range, the switch comprising:
a plurality of modules, each of the plurality of modules being connectable to another of the plurality of modules, first contacts of a first module of the plurality of modules being connectable with second contacts of another one of the plurality of modules,
wherein the first module is a connection module, electrical connections running into an interior of the switch starting from the connection module for connection purposes, and
wherein a second module of the plurality of modules is a manual plug module, connectable via its second contacts to the connection module, electrical connections passing external to the switch starting from the manual plug module for connection purposes,
wherein a third module of the plurality of modules is a communication module including second contacts on one contact side and first contacts on an opposite contact side, the communication module being connectable via its second contacts to the connection module and the manual plug module being connectable via its second contacts to the communication module, and second contacts of the communication module being electrically connectable to first contacts of the communication module or to a communication electronics system,
wherein the communication module is in the form of a communication adapter and wherein the communication electronics system is connectable to the communication adapter.

18. The switch of claim 17, wherein the communication electronics system is connectable to the communication adapter on one of the two sides which run transverse to the contact sides.

19. The switch of claim 17, wherein the plurality of modules are in the form of contact strips including contacts at least on one side.

20. The switch of claim 17, wherein each of the plurality of modules are connectable by being pluggable to another of the plurality of modules via a plug connection.

* * * * *